(12) United States Patent
Bartels et al.

(10) Patent No.: US 7,576,907 B1
(45) Date of Patent: Aug. 18, 2009

(54) PHASE AND AMPLITUDE LIGHT PULSE SHAPING USING A ONE-DIMENSIONAL PHASE MASK

(75) Inventors: Randy A. Bartels, Fort Collins, CO (US); Jesse W. Wilson, Fort Collins, CO (US); Philip Schlup, Fort Collins, CO (US)

(73) Assignee: Colorado State University Research Foundation, Fort Collins, CO (US)

( * ) Notice: Subject to any disclaimer, the term of this patent is extended or adjusted under 35 U.S.C. 154(b) by 0 days.

(21) Appl. No.: 12/119,443

(22) Filed: May 12, 2008

(51) Int. Cl.
*G02B 1/29* (2006.01)
(52) U.S. Cl. ............. 359/298; 359/300; 359/302; 359/279
(58) Field of Classification Search ............. 359/298, 359/300, 302, 297, 279, 238, 239
See application file for complete search history.

(56) References Cited

U.S. PATENT DOCUMENTS

2005/0232317 A1\* 10/2005 Dantus et al. ............. 372/32

OTHER PUBLICATIONS

Eugene Frumker and Yaron Silberberg, "Phase and Amplitude Pulse Shaping with Two-Dimensional Phase-Only Spatial Light Modulators," J. Opt. Soc. Am. B 24, 2940-2947 (2007).
A.M. Weiner, "Femtosecond Optical Pulse Shaping and Processing," Prog. Quantum Electron. 19, 161-237 (1995).
S. Akturk et al., "Extremely Simple Single-Prism Ultrashort-Pulse Compressor," Opt. Express 14, 10,101-10,108 (2006).
D.J. Kane and R. Trebino, "Characterization of Arbitrary Femtosecond Pulses Using Frequency-Resolved Optical Gating," IEEE J. Quantum Electron. 29, 571-579 (1993).
D.J. Kane, "Real-Time Measurement of Ultrashort Laser Pulses Using Principal Component Generalized Projections," IEEE J. Sel. Top. Quantum Electron. 4. 278-284 (1998).
P. Schlup et al., "Dispersion-Balancing of Variable-Delay Monolithic Pulse Splitters," Appl. Opt. 46, 5967-5973 (2007).
M. Takeda et al., "Fourier-Transform Method of Fringe-Pattern Analysis for Computer-Based Topography and Interferometry," J. Opt. Soc. Am. 72, 156-160 (1982).
J. Wilson et al., "Ultrafast Phase and Amplitude Pulse Shaping with a Single, One-Dimensional, High-Resolution Phase Mask," Optics Express, vol. 15., No. 14, (2007).

(Continued)

*Primary Examiner*—Timothy J Thompson
(74) *Attorney, Agent, or Firm*—Samuel M. Freund; Cochran Freund & Young LLC (57) ABSTRACT

Simultaneous amplitude and phase control of ultrafast laser pulses using a single, linear (one-dimensional) liquid crystal spatial light modulator is described. Amplitude shaping is accomplished by writing a high-frequency phase grating having a spatial period much smaller than the spectral focus (over-sampling), onto the modulator, and diffracting away selected frequencies in a controllable manner, while spectral phase control is imparted by adding an appropriate slow phase bias to the modulator. The close pixel spacing, large number of pixels, and small footprint of the reflective spatial light modulator employed with an angular wavelength dispersive element in a folded Martinez stretcher, enables a simple and compact apparatus to be achieved. The high reflectivity of the spatial light modulator results in a highly efficient pulse shaper when either a prism or diffractive grating is used for the angular dispersive element. The use of a transmissive spatial light modulator in an unfolded Martinez stretcher configuration is also described.

30 Claims, 7 Drawing Sheets

OTHER PUBLICATIONS

M. Wefers et al., "Generation of High-Fidelity Programmable Ultrafast Optical Waveforms," Optics Letters, vol. 20, No. 9 (1995).

C. Vozzi et al., "High-Energy, Few-Optical-Cycle Pulses at 1.5 with Passive Carrier-Envelope Phase Stabilization," Optics Express, vol. 14, No. 21 (2006).

J. Vaughan et al., "Automated Two-Dimensional Femtosecond Pulse Shaping," J. Opt. Soc. Am. B., vol. 19, No. 10, 2489-2495 (2002).

J. Vaughan et al., "Diffraction-Based Femtosecond Pulse Shaping with a Two-Dimensional Spatial Light Modulator," Optics Letters, vol. 30, No. 3, 323-325 (2005).

J. Vaughan et al., "Automated Spatiotemporal Diffraction of Ultrashort Laser Pulses," Optics Letters, vol. 28, No. 23, 2408-2410 (2003).

C. Dorrer et al., "Design and Analysis of Binary Beam Shapers Using Error Diffusion," J. Opt. Soc. Am. B., vol. 24, No. 6, 1268-1275 (2007).

T. Feurer et al., "Multidimensional Control of Femtosecond Pulses by use of a Programmable Liquid-Crystal Matrix," Optics Letters, vol. 27, No. 8, 652-654 (2002).

O. Masihzadeh et al., "Complete Polarization State Control of Ultrafast Laser Pulses with a Single Linear Spatial Light Modulator," Optics Express, vol. 15., No. 26 (2007).

E. Frumker et al., "Femtosecond Pulse-Shape Modulation at Nanosecond Rates," Optics Letters, vol. 30., No. 20, 2796-2798 (2005).

V. Bagnoud et al., "Independent Phase and Amplitude Control of a Laser Beam by Use of a Single-Phase-Only Spatial Light Modulator," Optics Letters, vol. 29., No. 3 (2004).

F. M. Reinert et al., "Shaping a Femtosecond Pulse with a Programmable Thermo-Optically Driven Phase Modulator," Optics Express, vol. 15, No. 7, (2007).

E. Frumker et al., "Femtosecond Pulse Shaping Using a Two-Dimensional Liquid-Crystal Spatial Light Modulator," Optics Letters, vol. 32, No. 11, 1384-1386 (2007).

\* cited by examiner

PHASE AND AMPLITUDE LIGHT PULSE SHAPING USING A ONE-DIMENSIONAL PHASE MASK

STATEMENT REGARDING FEDERAL RIGHTS

This invention was made with government support under Contract Number ECS-0348068 awarded by the U.S. National Science Foundation to Colorado State University. The government has certain rights in the invention.

FIELD OF THE INVENTION

The present invention relates generally to light pulse shaping and, more particularly, to independent phase and amplitude shaping of ultrafast light pulses using a single, one-dimensional, high resolution liquid crystal phase mask.

BACKGROUND OF THE INVENTION

Programmable ultrafast optical pulse shapers are ubiquitous, with applications ranging from simple dispersion control to carefully shaped laser pulses used for coherent control of quantum dynamics, femtosecond microscopy and spectroscopy, nonlinear fiber optics, high harmonic generation, etc. While many applications utilize spectral phase-only shaping for simplicity, one also needs control over amplitude to access a complete range of temporal shapes, for example, square and sinc pulses. Such control in the standard zero-dispersion Martinez stretcher has been implemented with volume Bragg gratings written with an acousto-optic modulator (AOM) crystal, pairs of liquid crystal spatial light modulators (LC-SLMs) and, more recently, by a two-dimensional (2D) LC-SLM having a blazed phase grating in the direction lacking spectral dispersion. A complementary technology, acousto-optic programmable dispersion filters (AOPDFs), also provides spectral phase and amplitude control.

Diffractive effects have been used in AOM devices to shape both spectral phase and amplitude by Bragg diffraction of the incident light at the Fourier plane, and reconstructing the first-order diffracted beam into a shaped pulse. Thus, the acousto-optic device throughput is fundamentally limited by the first-order diffraction efficiency, reported to be ~50% at 620 nm in an experimental device. The optical bandwidth of AOM shapers is limited to a single octave since beyond this, higher order diffracted beams will overlap. AOMs can be rapidly reconfigured between pulses, but finite acoustic wave velocity places an upper limit on the repetition rate of shaped pulses. While this is well-suited for amplified pulses, a pulse picker must be employed in the typical cases of multi-MHz ultrafast oscillator pulse trains.

Independent phase and amplitude control has been achieved using two, LC-SLM arrays. However, two modulators are required which doubles the circuitry, increases the bulk and requires accurate alignment of the two modulators. Additionally, the requirement for two polarizers increases losses and dispersion. More recently, a zero-order apparatus has been reported for complex-spectral phases and amplitude modulation. Eugene Frumker and Yaron Silberberg in "Phase and Amplitude Pulse Shaping with Two-Dimensional Phase-Only Spatial Light Modulators," J. Opt. Soc. Am. B 24, 2940-2947 (2007) describe a two-dimensional spatial light modulator disposed in the Fourier plane of a cylindrical Fourier lens which ensures that each wavelength component, while focused in the horizontal direction at the Fourier plane, extends over a few millimeters in the vertical direction for independent modulation of both spectral phases and amplitudes as a result of a vertical phase grating being formed in each column of the two-dimensional spatial light modulator.

SUMMARY OF THE INVENTION

Accordingly, it is an object of the present invention to provide an apparatus and method for phase and amplitude light pulse shaping using a single, one-dimensional (linear) phase mask.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

To achieve the foregoing and other objects, and in accordance with the purposes of the present invention, as embodied and broadly described herein, the apparatus for phase and amplitude light pulse shaping, hereof, includes in combination: a pulsed light source for generating light having a chosen optical bandwidth and center wavelength; a focusing optic having a front focal plane and an equally distant Fourier plane; a dispersive element disposed at the approximate location of the front focal plane of the focusing element for receiving light from the pulsed light source and for dispersing light within the chosen bandwidth into wavelengths, wherein the dispersed light exiting the dispersive element is focused at the Fourier plane by the focusing element; a reflective liquid crystal spatial light modulator having a one-dimensional array of pixel electrodes with light transmissive gaps therebetween, wherein the refractive index of each gap may be varied by applying chosen voltages to adjacent pixel electrodes, disposed at the approximate location of the Fourier plane and adapted for receiving the focused, dispersed light, the focused light intercepting a large number of pixel electrodes in the array of pixel electrodes; and means for generating chosen voltages on the pixel electrodes of the spatial light modulator; whereby a high spatial-frequency periodic phase grating is formed effective for scattering selected components of the dispersed light to higher orders, and for reflecting the zero-order light beam back to the focusing element and onto the dispersive element from which a shaped pulse is reflected, a phase delay being generated on chosen wavelengths by biasing the phase grating with a desired offset phase.

In another aspect of the invention, and in accordance with its objects and purposes, the method for phase and amplitude light pulse shaping, hereof, includes the steps of: generating pulsed light having a chosen optical bandwidth and center wavelength; dispersing the pulsed light into wavelengths within the optical bandwidth using an optical dispersive element; generating a high spatial-frequency periodic phase grating effective for scattering selected frequency components to higher orders, and for introducing a chosen phase delay at selected wavelengths, using a reflective spatial light modulator; focusing the dispersed light into a spot much larger than the spatial frequency of the phase grating at the Fourier plane of a focusing element, wherein the distance between the focusing element and the dispersive element is approximately equal to the distance between the focusing element and the reflective light modulator; and reflecting the zero-order light beam from said reflective light modulator back to the focusing optic and onto the dispersive element; whereby a shaped pulse is reflected from the dispersive element.

In yet another aspect of the invention, and in accordance with its objects and purposes, the apparatus for phase and amplitude light pulse shaping, hereof, includes in combination: a pulsed light source for generating light having a chosen optical bandwidth and center wavelength; a focusing element having a front focal plane and an equally distant back Fourier plane; a dispersive element disposed at the approximate location of the front focal plane of the focusing element for receiving light from the pulsed light source and for dispersing light within the chosen bandwidth into wavelengths, wherein the dispersed light exiting the dispersive element is focused at the Fourier plane of the focusing element; and means, disposed at the approximate location of the Fourier plane, for receiving the focused, dispersed light, for generating a high spatial-frequency periodic phase grating effective for scattering selected components of the dispersed light to higher orders, wherein the focused light intercepts a large number spatial modes of the grating, and for reflecting the zero-order light beam back to the focusing optic and onto the dispersive element from which a shaped pulse is reflected, a phase delay being generated on the chosen wavelengths by producing a desired offset phase on the phase grating.

In still another aspect of the invention, and in accordance with its objects and purposes, the apparatus for phase and amplitude light pulse shaping, hereof, includes in combination: a pulsed light source for generating light having a chosen optical bandwidth and center wavelength; a focusing element; a dispersive element for receiving light from the pulsed light source, for dispersing light within the chosen bandwidth into wavelengths, and for directing the dispersed light to the focusing element; and means for receiving the focused, dispersed light, for generating a high spatial-frequency periodic phase grating effective for scattering selected components of the dispersed light to higher orders wherein the focused light intercepts a large number spatial modes of the grating, and for reflecting the zero-order light beam to the focusing element; whereby the focusing element, the dispersive element and the means for generating the phase grating are disposed in a Martinez stretcher configuration, wherein a shaped pulse is reflected from the dispersive element, a phase delay being generated on the chosen wavelengths by producing a desired offset phase on the phase grating.

In another aspect of the invention, and in accordance with its objects and purposes, the apparatus for phase and amplitude light pulse shaping, hereof, includes in combination: a pulsed light source for generating light having a chosen optical bandwidth and center wavelength; a first focusing element having a front focal plane and an equally distant first back Fourier plane; a first dispersive element disposed at the approximate location of the front focal plane of the first focusing optic for receiving light from said pulsed light source and for dispersing light within the chosen bandwidth into wavelengths, wherein the dispersed light exiting the first dispersive element is focused at the first Fourier plane by the first focusing element; a second focusing element having a second front focal plane and an equally distant second back Fourier plane; means, disposed at the approximate location of the first Fourier plane, for receiving the focused, dispersed light, for generating a high spatial-frequency periodic phase grating effective for scattering selected components of the dispersed light to higher orders, wherein the focused light intercepts a large number spatial modes of the grating; and for transmitting the zero-order light beam through the phase grating to the second focusing optic, the phase grating being disposed at the second Fourier plane of the second focusing element; and a second dispersive element disposed at the second front focal plane of the second focusing element for receiving the focused light from the second focusing element and from which a shaped pulse is reflected, a phase delay being generated on the chosen wavelengths by producing a desired offset phase on the phase grating.

In yet another embodiment of the present invention, and in accordance with its objects and purposes, the apparatus for phase and amplitude light pulse shaping, hereof, includes in combination: a pulsed light source for generating light having a chosen optical bandwidth and center wavelength; a first focusing element; a second focusing element; a first dispersive element for receiving light from the pulsed light source and for dispersing light within the chosen bandwidth into wavelengths and for directing the dispersed light to the first focusing element; means, for receiving the focused, dispersed light, for generating a high spatial-frequency periodic phase grating effective for scattering selected components of the dispersed light to higher orders, wherein the focused light intercepts a large number spatial modes of the grating, and for transmitting the zero-order light beam to the second focusing element; a second dispersive element for receiving light from the second focusing element, whereby the first focusing element, the second focusing element, the first dispersive element, the second dispersive element, and the phase grating are disposed in an unfolded Martinez stretcher configuration, wherein a shaped pulse is reflected from the second dispersive element, a phase delay being generated on the chosen wavelengths by producing a desired offset phase on the phase grating.

Benefits and advantages of the present invention include, but are not limited to, providing an apparatus and method for phase and amplitude light pulse shaping using a single, commercially available, one-dimensional phase mask having liquid crystal on complementary metal oxide semiconductor (CMOS) technology, thereby permitting smaller pixel pitch resulting from high-resolution lithography, and significantly reduced pixel driving requirements. The present apparatus and method can be used with octave-spanning optical bandwidths by employing a prism as the dispersive element since the overlapping diffracted orders from the phase grating are discarded.

BRIEF DESCRIPTION OF THE DRAWINGS

The accompanying drawings, which are incorporated in and form a part of the specification, illustrate the embodiments of the present invention and, together with the description, serve to explain the principles of the invention. In the drawings:

FIG. 1A is a schematic representation of two embodiments of the apparatus of the present invention, showing the dispersive element being a diffraction grating or a prism, while

FIG. 3A shows light scattered in higher order grating modes of the spatial light modulator, while transmitting light in the zero order for the unfolded prism embodiment shown in FIG. 1B hereof, while

FIG. 4A is a graph of the phase φ as a function of wavelength λ and drive level where the surface mesh lines are shown to enhance visualization of surface curvature, although actual data are collected at higher resolution, while

FIG. 6A is a graph of the measured spectral intensity (curve (a)) and phase (curve (b)) for splitting a pulse into a delayed pair, while

FIG. 8A is a graph of the unshaped (curve (a)) and shaped (curve (b)) square spectrum as a function of light frequency, while

DETAILED DESCRIPTION OF THE INVENTION

Briefly, the present invention includes phase and amplitude pulse shaping using a Martinez stretcher and a single, linear (one-dimensional), high-resolution liquid crystal-spatial light modulator (LC-SLM). Typically, when one designs a pulse shaper employing a LC-SLM, the spatial mode in the Fourier plane is matched to the pixel size of the SLM in order to optimize the spectral resolution. In accordance with the teachings of the present invention, the spatial mode includes a large number of SLM pixels, effectively oversampling the spatial mode. This permits spectral amplitude shaping by means of a high spatial-frequency periodic phase grating. Diffraction from this phase grating is used to scatter intensity from selected frequency components into higher orders, and to collect the zero-order beam to reconstruct a shaped pulse. The maximum throughput is attained by switching off the phase grating. Complete spectral attenuation is possible in principle by an appropriate choice of phase grating depth of modulation.

The present invention can be used for octave-spanning optical bandwidths when a prism is employed as the dispersive element since the overlapping diffracted orders from the phase grating may be discarded. In addition, the LC-SLM phase masks can remain static from one pulse to another, allowing for operation with oscillator pulse trains without the use of a pulse picker. The masks can typically be changed in 30 ms. Combined with the high optical reflectivity of the LC-SLM (greater than 90%), these aspects make this technique especially attractive for nonlinear optical experiments with an oscillator and octave-spanning supercontinuum spectra.

Thus, independent phase and amplitude control of light incident is shown to be achievable using a single, one-dimensional spatial light modulator activated to generate a periodic phase mask which performs as a grating, diffracting a portion of the light away from the output aperture, where focusing optics produce a spot size at the focal plane covering numerous pixels (oversampling).

The following mathematical analysis employing the notation found in "Femtosecond Optical Pulse Shaping and Processing" by A. M. Weiner, Prog. Quantum Electron. 19, 161-237 (1995), may be used to better understand the present invention.

Assuming that the pulse incident on the SLM is a Gaussian mode in one spatial dimension, x:

$$E_{in}(x,t)=E_0\exp[-(x/w_{in})^2]u_{in}(t), \quad (1)$$

Where $E_0$ is the initial amplitude, $w_{in}$ is the $1/e^2$ radius of the beam, and $u_{in}(t)$ is the oscillatory temporal field. The focused field at the Fourier plane, where the phase mask is located, is related to $E_{in}$ by the Fourier transform which reduces to $$E_{in}(x_{fp})=E_0\exp\{-[(x_{fp}-\alpha\omega))w_{fp}]^2\}U_{in}(\omega) \quad (2)$$

Here α=dx/dω, which is set by the angular dispersion and the focal length of the Martinez stretcher. $U_{in}(\omega)$ is the Fourier transform of the incident pulse $u_{in}(t)$, and $w_{fp}$ is the spot size in the Fourier plane.

Applying a high-resolution phase-only mask which will be shown to include both an amplitude (t) and a phase (φ) component:

$$M(x_{fp})=t(x_{fp})\cdot\exp[i\phi(x_{fp})]. \quad (3)$$

The amplitude component of the mask is obtained by writing a phase grating to the spatial light modulator with a spatial frequency $f_g$ and a depth of modulation Δ, $$t(x_{fp})=\exp[i\Delta(x_{fp})\sin(2\pi f_g x_{fp})]. \quad (4)$$

From the generating function for Bessel functions, Eq. (4) may be expanded as:

$$t(x_{fp}) = \sum_{m=-\infty}^{\infty} J_m[\Delta(x_{fp})]\exp(i2\pi m f_g x_{fp}), \quad (5)$$

Where m describes the scattering order of the phase grating. If $f_g$ is sufficiently high, the pulse shaper optics only collect the zero order, such that $$t(x_{fp})\approx J_0[\Delta(x_{fp})], \quad (6)$$

and the effective mask is given by:

$$M(x_{fp})=J_m[\Delta(x_{fp})]\cdot\exp[i\phi(x_{fp})], \quad (7)$$

or $$M(x_{fp})=\exp\{i[\Delta(x_{fp})\sin(2\pi f_g x_{fp})+\phi(x_{fp})]\} \quad (8)$$

Effectively, the spatial mode of the beam is oversampled such that the phase grating diffracts light into multiple orders, m, with an angular separation between these orders determined by the periodicity of the grating. Given a collection lens aperture, A, and a focal length, f, the minimum grating spatial frequency can be calculated. From the grating equation with m=1, central wavelength $\lambda_0$ and diffraction angle $\theta$: $\lambda_0 f_g = \sin\theta$ and the geometric relationship $\tan\theta = A/(2f)$, in order for the first order diffracted light to fall outside of the lens aperture, the following condition must be met:

$$f_g \geq \frac{A}{2\lambda_0 f}, \qquad (9)$$

and the frequency-domain power transmissivity of the phase grating is determined by the zero-order function:

$$T(\omega = x_{fp}/\alpha) = |J_0[\Delta(x_{fp})]|^2. \qquad (10)$$

Given the zero order Bessel function mapping for the reflected zero-order diffraction of the sinusoidal phase grating, one expects a complete range of amplitude control. With a grating of sufficiently high spatial frequency $f_g$, the grating depth can vary from $\Delta=0$ for full transmissivity, to $\Delta\approx 2.4$ (the first zero of $J_0$) for full extinction. In order to write such gratings, an accurate calibration of the pulse shaper; that is, the mapping between pixel index and wavelength, as well as that between pixel drive voltage and the phase, must be made. To add a phase delay at any particular frequency, the rapid phase grating is biased with the desired offset phase.

Thus, full spectral amplitude control may be expected from a high-frequency sinusoidal phase grating by adjusting $\Delta(x_{fp})$ to modulate spatial diffraction across the spectrum dispersed in the Fourier plane, while spectral phase control may be imparted by adding the appropriate slow phase value $\phi(x_{fp})$.

Figure 1A:
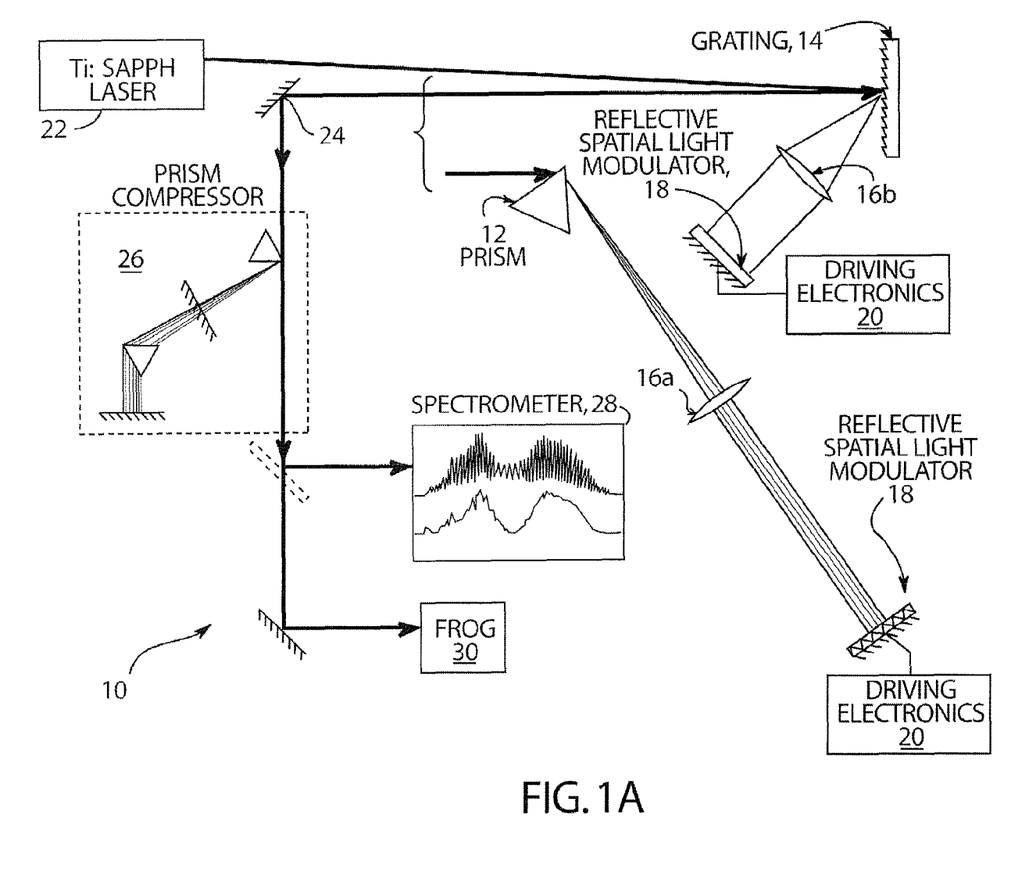

Reference will now be made in detail to the present embodiments of the invention, examples of which are illustrated in the accompanying drawings. In the Figures, similar structure will be identified using identical reference characters. Turning now to FIG. 1A, two embodiments of the present apparatus for shaping the phase and amplitude of ultrafast light pulses, 10, are illustrated. A first embodiment includes prism, 12, as a dispersive optical element having low angular dispersion, and suited to octave-spanning spectra; the other employing grating, 14, generates high angular dispersion. Either dispersive element is placed at the front focal plane of a convex lens, 16a or 16b, respectively, and reflective spatial light modulator (SLM), 18, driven by driving electronics, 20, is placed at the back focal plane or Fourier plane, of lens 16a or 16b. The lens described in FIG. 1A includes a spherical lens, but cylindrical lenses, spherical concave mirrors, and cylindrical concave mirrors may also be employed, as examples, for the focusing optic.

The SLM or phase mask employed was a reflective, 1×12,288 Linear Series spatial light modulator commercially available from Boulder Nonlinear Systems (Lafayette, Colo.). The liquid crystal elements have a 1.6 µm pixel pitch, including a 1.0 µm transmissive electrode and a 0.6 µm gap between electrodes. The gap is transmissive, with a refractive index dependent on the voltages applied to adjacent pixel electrodes. A sinusoidal grating pattern was generated on the SLM, but other periodic waveforms may also be used. Pulsed light source, 22, was a Ti:sapphire laser oscillator (KM Labs) having a 40 nm optical bandwidth centered at about 790 nm, collimated to 2 $w_0\approx 4$ mm diameter and directed into either of dispersive elements 12 or 14. Other pulsed laser sources may be utilized in the region between about 400 nm and about 1650 nm where liquid crystals transmit. For the prism embodiment, focusing element 16a was a 750 mm focal length lens, and dispersive element 12 was a Brewster prism fabricated from SF10-type glass. The spectral focus was 2 $w_0\approx 190$ µm or 118 pixels. In the grating version, a 600 mm$^{-1}$ grating 14 was used with a 200 mm focal length lens 16b. The spectral focus was 2 $w_0\approx 50$ µm or 31 pixels. The SLM reflectivity was measured to be 93% and the total shaper efficiencies were determined to be 77% and 35% for the prism and grating shapers, respectively, although higher throughput may be possible with appropriate anti-reflection coated optics and a grating optimized for efficiency.

As with any Martinez stretcher, initial quadratic spectral phase on the input pulses can be compensated for by adjustment away from the exact 4f condition. Further, mirror, 24, may direct light reflected from the dispersive element after being processed by the pulse shaper into single-prism compressor, 26, or other type of compressor in order to compensate for residual chirp on the oscillator output (See, e.g., S. Akturk et al. in "Extremely Simple Single-Prism Ultrashort-Pulse Compressor," Opt. Express 14, 10,101-10,108 (2006).). This preserves the maximum dynamic range of SLM phase for pulse shaping.

The present pulse shaper was characterized using spectral interferometry, 28, described in the EXAMPLE, while temporal pulse measurements were performed using a second harmonic generation frequency resolved optical gating (SHG-FROG), 30, (See, e.g., D. J. Kane and R. Trebino in "Characterization of Arbitrary Femtosecond Pulses Using Frequency-Resolved Optical Gating," IEEE J. Quantum Electron. 29, 571-579 (1993)), making use of a high-speed principal component generalized projection (PCGP) phase retrieval algorithm (See, e.g., D. J. Kane in "Real-Time Measurement of Ultrashort Laser Pulses using Principal Component Generalized Projections," IEEE J. Sel. Top. Quantum Electron. 4, 278-284 (1998)).

Figure 1B:
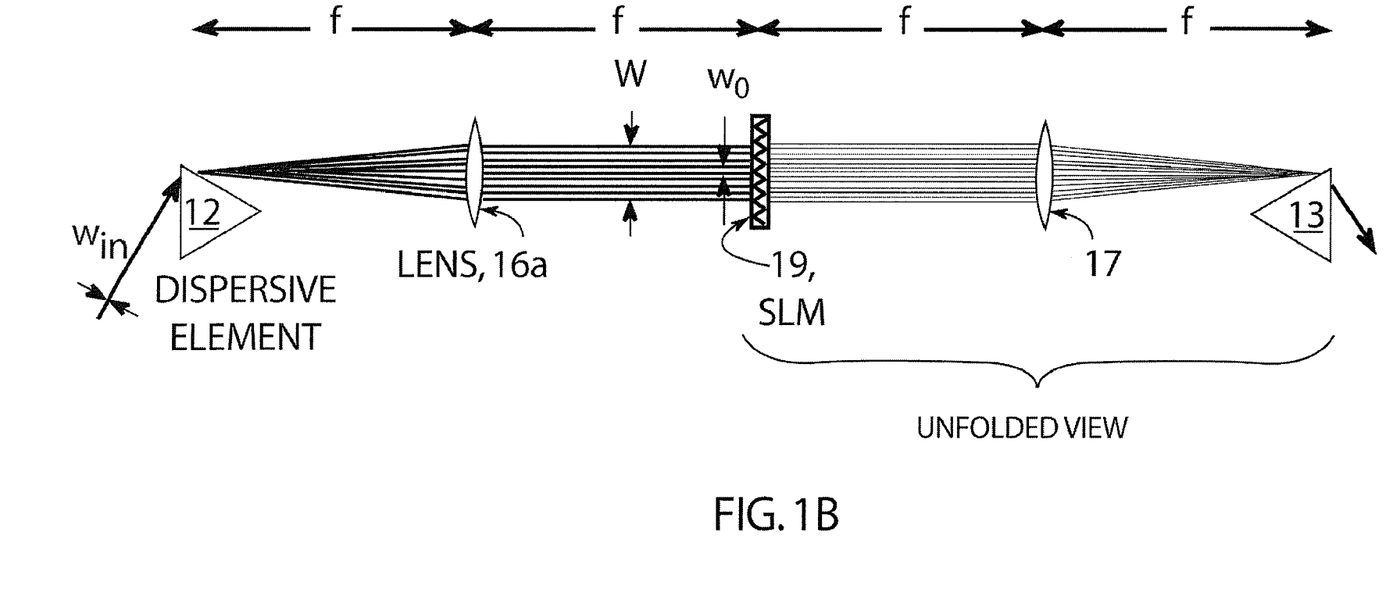
FIG. 1B is a schematic representation of the unfolded view of the prism embodiment of the apparatus shown in FIG. 1A illustrating the distances between the components of a Martinez stretcher, and the additional components required for an unfolded configuration.

FIG. 1B is a schematic representation of the unfolded view of the prism embodiment of the apparatus shown in FIG. 1A illustrating the distances between the components for a Martinez (zero-dispersion) stretcher. Here, $$W = \frac{d\theta}{d\lambda} f \Delta\lambda,$$

and $$w_0 = \frac{f\lambda}{\pi w_{in}},$$

where $w_{in}$ is the diameter of the input pulsed beam and f is the focal length of the focusing optics. Although a folded Martinez stretcher is shown in FIG. 1A for the reflecting spatial light modulator hereof, an unfolded stretcher may be used where transmitting spatial light modulator, 19, is employed. The reflecting spatial light modulator is basically a transmitting modulator having a reflective backing mirror. Additional components include second dispersive element, 13, and second focusing element, 17.

Figure 2:
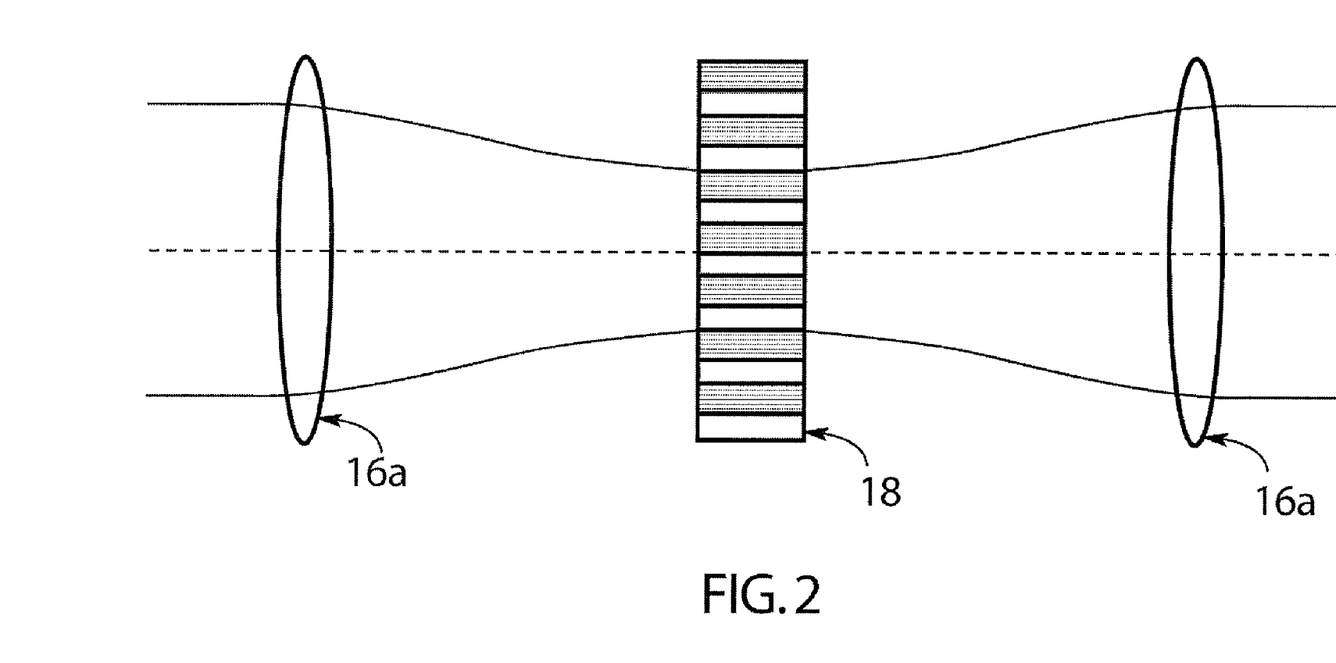
FIG. 2 is a schematic representation of the spatial light modulator in the Fourier plane of the focusing element where the light beam intercepts several pixels on the face of the spatial light modulator.

FIG. 2 is a schematic representation of the spatial light modulator in the Fourier plane of the focusing element where the light beam intercepts several pixels on the face of the modulator illustrated in the unfolded configuration as shown in FIG. 1B hereof.

Figure 3A:
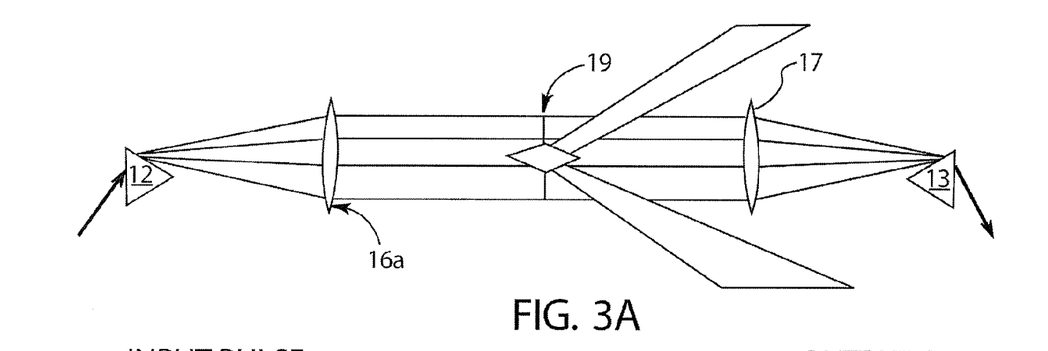
Figure 3B:
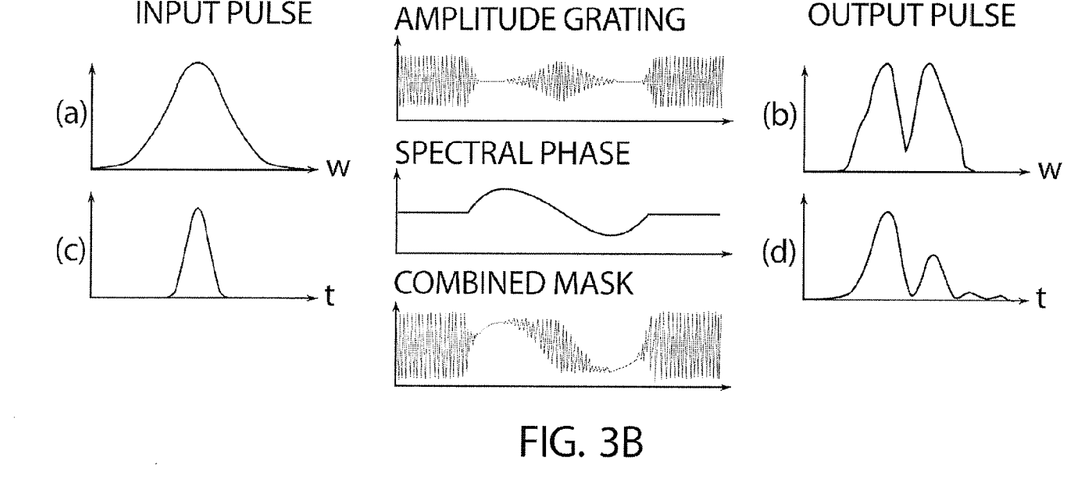
FIG. 3B shows input and output light pulses in the frequency domain (curves (a) and (b), respectively), and input and output light pulses in the time domain (curves (c) and (d), respectively) when a sample amplitude and frequency pattern are applied to the spatial light modulator.

FIG. 3A shows light scattered in higher order grating modes of the spatial light modulator, while transmitting light in the zero order for the unfolded prism embodiment shown in FIG. 1B hereof, while FIG. 3B shows input and output light pulses in the frequency domain (curves (a) and (b), respectively), and input and output light pulses in the time domain (curves (c) and (d), respectively) when a sample amplitude and frequency pattern are applied to the spatial light modulator.

Having generally described the invention, the following EXAMPLE provides additional details:

EXAMPLE

As with any pulse shaping device, an accurate calibration was obtained in order to generate predictable pulse shapes. In order to characterize the phase response of the LC-SLM a functional mapping from wavelength to pixel, and drive voltage to phase was obtained. The phase grating was then analyzed for amplitude shaping to establish an effective grating spatial frequency $f_g$ and calibrating the relationship between depth of modulation $\Delta$ and transmission T.

Figure 4A:
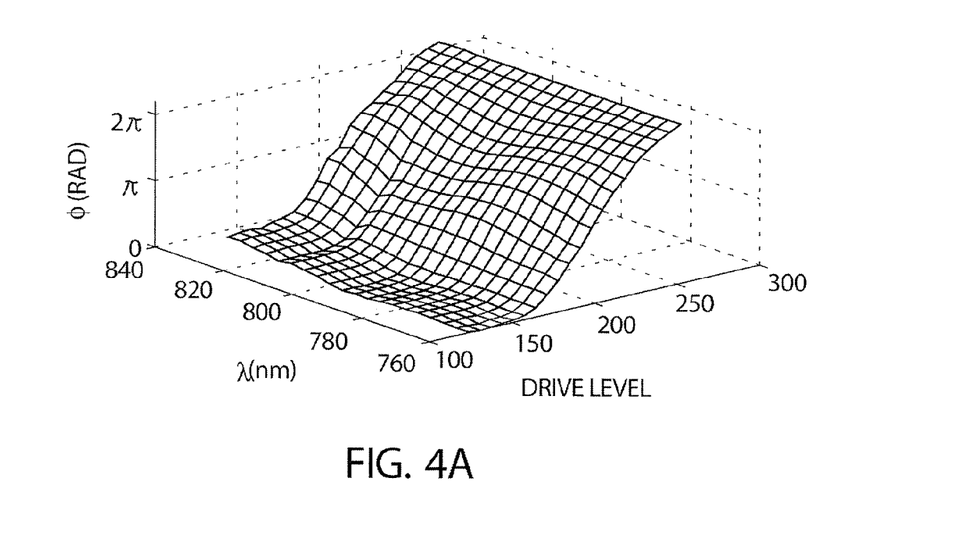

(a) Phase Calibration:

To calibrate the device the relationship between pixel and optical frequency was determined by sweeping $\pi$-phase step across the SLM and observing the dip in the transmitted spectrum due to the phase discontinuity. A quadratic curve was fit to these data, and from the first-order coefficient of this fit, $\alpha \approx 28$ mm rad$^{-1}$ fs was estimated for the prism shaper, and $\alpha \approx 44$ mm rad$^{-1}$ fs for the grating shaper; both agree well with the theoretical values of $\alpha \approx 26$ mm rad$^{-1}$ fs and $\alpha \approx 44$ mm rad$^{-1}$ fs, respectively, calculated from the optical dispersion of the prism or grating. Inline spectral interferometry, where a birefringent crystal is employed to split the input pulse into two, time-delayed pulses having orthogonal polarizations (See, e.g., P. Schlup et al. in "Dispersion-Balancing of Variable-Delay Monolithic Pulse Splitters," Appl. Opt. 46, 5967-5973 (2007)), the LC-SLM shaping only one of the polarizations, leaving the second as a reference. A polarizer at 450 projects the two pulses to the same polarization and the resulting interference fringes are measured using spectrometer (OceanOptics) 28 in FIG. 1A. The phase difference between the pulses is very stable, and in-line spectral interferometry gave similar phase measurements to those from an external Mach-Zehnder interferometer. The phase difference is extracted using a Fourier sideband filtering algorithm (See, e.g., M. Takeda et al. in "Fourier-Transform Method of Fringe-Pattern Analysis for Computer-Based Topography and Interferometry," J. Opt. Soc. Am. 72, 156-160 (1982)). The drive voltage-to-phase relationship is calibrated by driving all the SLM pixels through their drive range, measuring interference fringes, and computing the resulting imparted phase. FIG. 4A is a graph of this calibration for the prism shaper; results are similar for the grating case.

Figure 4B:
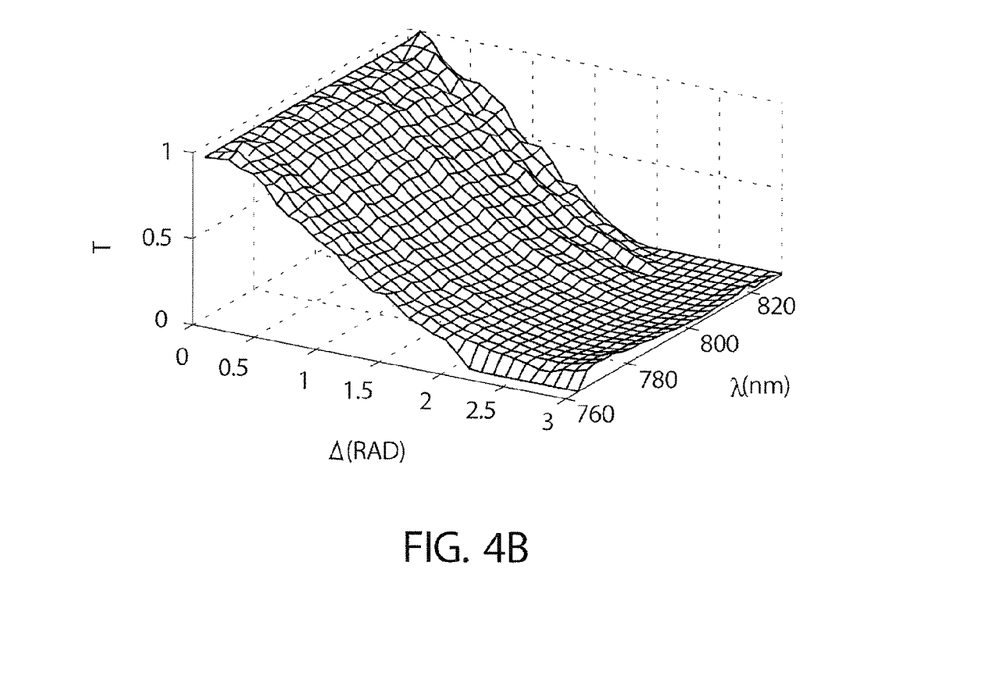
FIG. 4B is a graph of the measured transmission T as a function of increasing phase grating depth Δ as applied across the entire phase mask where the surface mesh lines are shown to enhance visualization of the surface curvature, although actual data is collected at higher resolution.

(b) Amplitude Calibration:

Having calibrated the phase, the amplitude control afforded by the present apparatus and method is characterized. Applying a range of phase gratings, an effective $f_g$=27 mm$^{-1}$ for the prism-based shaper is established, and $f_g$=60 mm$^{-1}$ for the grating-based shaper. For both embodiments, the effective phase grating period is approximately 2 $w_0$/5. The spatial frequency is sufficiently high that the grating diffracts light outside of the aperture of the apparatus, yet sufficiently low that the discreteness of the SLM has a negligible impact. The transmission T was measured as the ratio of shaped/unshaped spectral intensity, observed from the shaper output. FIG. 4B shows T across the measured spectrum for a 62 μm period sinusoidal phase grating on the prism-based shaper, varying $\Delta$. A calculation for 790 nm shows that the experimental value of T agrees favorably with the $|J_0(\Delta)|^2$ predicted theoretically by Eq. 10. In this case, the maximum attenuation at the center wavelength is 97%.

(c) Pulse Shapes:

The above calibration allows the generation of arbitrary pulse shapes with specified amplitude and phase. The residual spectral phase distortion present after prism compressor 26 (FIG. 1A) is first removed. To accomplish this, a FROG trace with the mask set to constant zero phase is measured, and the phase is extracted using the PCGP algorithm. The inverted phase is added to the shaper mask to obtain near-transform-limited 28 fs pulses which was verified by another FROG measurement. The ability to compress pulses by measuring a spectral phase and applying its inverse with the SLM validates both the calibration and pulse measurements.

Figure 5:
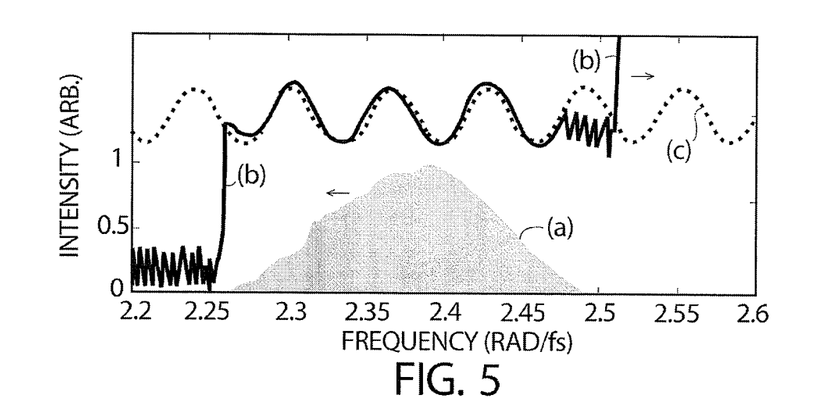
FIG. 5 is a graph of spectral intensity (curve (a)) and phase as measured by spectral interferometry (curve (b)) of the measured light as a function of light frequency, when a low-frequency sinusoidal spectral phase (curve (c)) is applied to the mask.
Figure 6A:
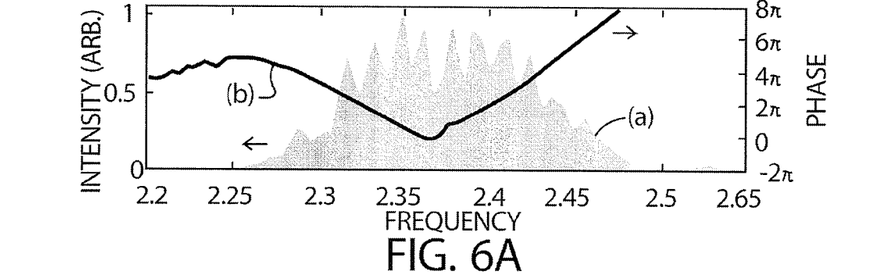
Figure 6B:
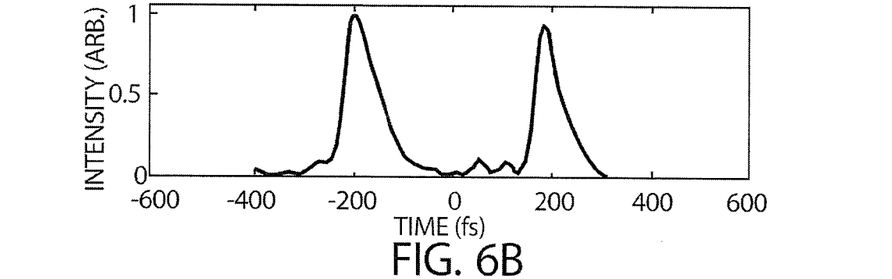
FIG. 6B is a graph of the temporal intensity as a function of light frequency showing a peak separation of 400 fs.

The phase shaping capabilities of the pulse shaper, independent of amplitude, was demonstrated by applying a sinusoidal and then a V-shaped spectral phase. In the case of sinusoidal phase, the imparted phase was measured with the above spectral interferometry procedure, and the results compared to the intended phase mask. FIG. 5 is a graph of spectral intensity (curve (a)) and phase as measured by spectral interferometry (curve (b)) of the measured light as a function of light frequency, when a low-frequency sinusoidal spectral phase (curve (c)) is applied to the mask, and shows excellent fidelity in producing this phase. In the case of a V-shaped spectral phase, the halves of the spectrum experience a linear phase having slope $\tau$, with opposite signs on each half. The effect is to split the pulse into a pair of pulses, separated in time by $2\tau$. Results for $2\tau$=400 fs are shown in FIGS. 6A and 6B where FIG. 6A is a graph of the measured spectral intensity (curve (a)) and phase (curve (b)) for splitting a pulse into a delayed pair, while FIG. 6B is a graph of the temporal intensity as a function of light frequency showing a peak separation of 400 fs. The observed spectral modulations are due to scattering at the $2\pi$ phase wrapping points.

Figure 7:
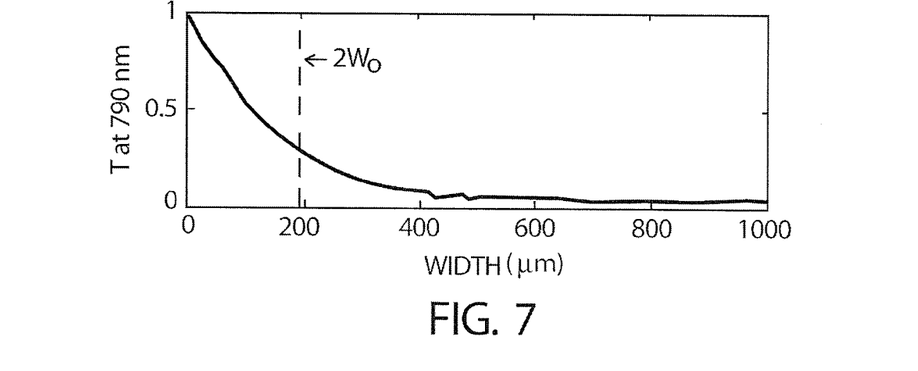
FIG. 7 is a graph of the measured transmission T at 790 nm as a function of phase grating width showing an increase in attenuation which levels off when the phase grating is wider than the spectral focus 2 $w_0$ indicated by the vertical dashed line.

For amplitude shaping, the effects of phase gratings with finite width across the mask were observed, and a temporal sinc$^2$ intensity profile was generated by shaping the spectrum into a square. A finite-width phase grating centered at 790 nm was applied to produce spectra with a notch in the center. The notch was broadened by widening the phase grating. As a phase grating having increasing width was applied to the center of the spectrum, it was found that for phase grating widths <2 $w_0$ the notch is as wide as the spectral focus and increases in attenuation until the width is comparable to the spectral focus, before broadening to cover more frequencies. FIG. 7 is a graph of the measured transmission T at 790 nm as a function of phase grating width showing an increase in attenuation which levels off when the phase grating is wider than the spectral focus 2 $w_0$ marked by the vertical dashed line. The attenuation plateaus once the phase grating width is of the order of the spatial mode size in the Fourier plane.

Figure 8A:
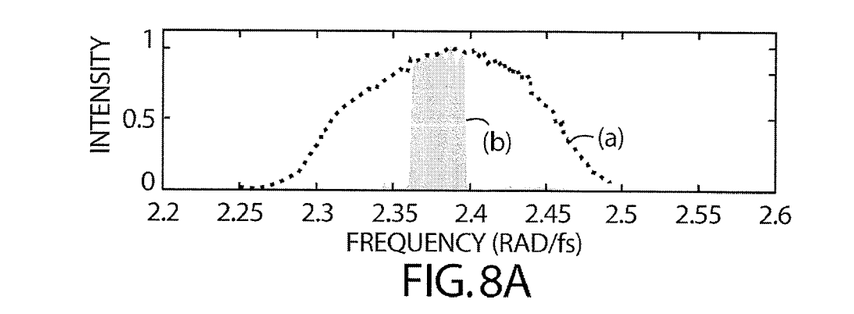
Figure 8B:
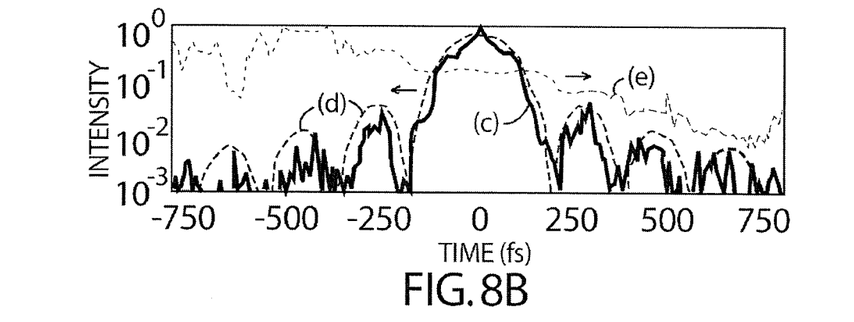
FIG. 8B is a graph of the resulting temporal profile (curve (c)), with a $sinc^2$ (curve (d)) for comparison, as a function of time, and the spectral phase (curve (e)) showing a π phase offset between adjacent lobes, as a function of time.

FIG. 8A is a graph of the unshaped (curve (a)) and shaped (curve (b)) square spectrum as a function of light frequency, while FIG. 8B is a graph of the resulting temporal profile (curve (c)), with a sinc$^2$ (curve (d)) for comparison, as a function of time, and the spectral phase (curve (e)) showing a $\pi$ phase offset between adjacent lobes, as a function of time. The mask attenuates frequencies outside the desired square, and is set to nearly flatten the top of the spectrum. Since the inverse Fourier transform of a square spectrum is a sinc function, the intensity profile of such a pulse is a sinc$^2$, with alternating $\pi$ phase, in good agreement with the retrieved pulses shown in FIG. 8B.

Figure 9:
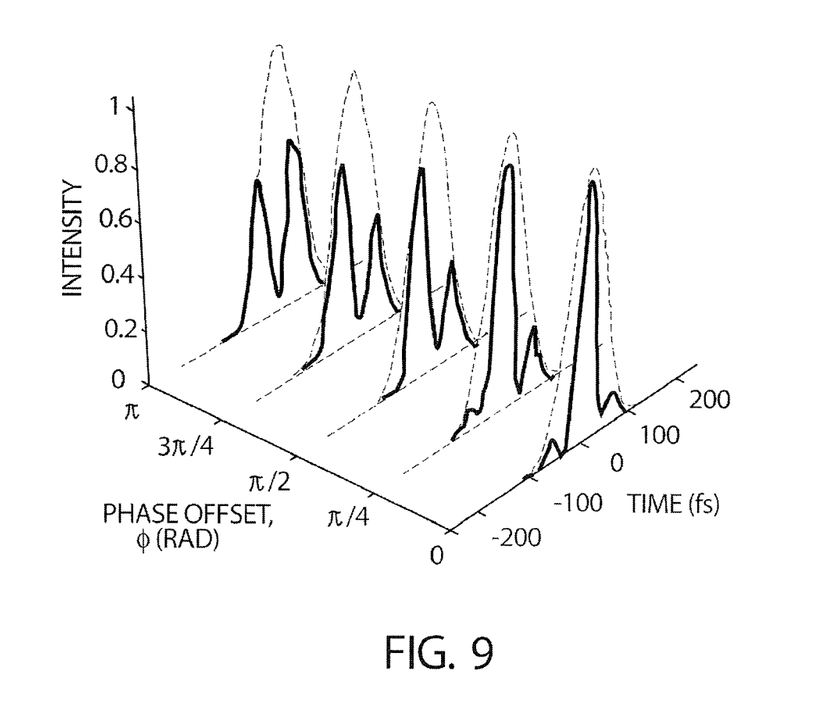
FIG. 9 is a graph of the intensity of the temporal profiles as a function of time and phase offset for the spectral double-slit-like measurement.

In order to demonstrate simultaneous control over spectral phase and amplitude, the spectrum was shaped into two lobes separated by 0.08 rad/fs and shifted the relative phase φ between the lobes. The spectral lobes interfere in the time-domain in a manner analogous to a double-slit experiment. FIG. 9 is a graph of the intensity of the temporal profiles as a function of time and phase offset for the spectral double-slit measurement. The intensity modulation period is set by the separation of the spectral peaks and agrees with the expected ~80 fs period. The temporal intensity interference structure shifts in the expected manner with the application of a relative phase between the two spectral lobes.

In summary, simultaneous amplitude and phase control of ultrafast laser pulses using a single linear LC-SLM has been demonstrated. The amplitude shaping is made possible by over-sampling each spectral focus and writing a phase grating with sufficiently high frequency, a procedure that may be extended to temporally shape octave-spanning spectra. The close pixel spacing, large number of pixels, and small footprint of the SLM used enables this simple and compact design. Moreover, the high reflectivity of the SLM also results in a highly efficient pulse shaper when a prism is used for the angular dispersive element. This pulse shaper design is anticipated to find wide-spread use due to high efficiency, cost-effectiveness and compactness with amplitude and phase shaping capability suitable for use with mode-locked oscillator pulse trains.

The foregoing description of the invention has been presented for purposes of illustration and description and is not intended to be exhaustive or to limit the invention to the precise form disclosed, and obviously many modifications and variations are possible in light of the above teaching. The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. An apparatus for phase and amplitude light pulse shaping, comprising in combination:
   a pulsed light source for generating light having a chosen optical bandwidth and center wavelength;
   a focusing element having a front focal plane and an equally distant back Fourier plane;
   a dispersive element disposed at the approximate location of the front focal plane of said focusing element for receiving light from said pulsed light source and for dispersing light within the chosen bandwidth into wavelengths, wherein the dispersed light exiting said dispersive element is focused at the Fourier plane by said focusing element;
   a reflective liquid crystal spatial light modulator having a one-dimensional array of pixel electrodes with light transmissive gaps therebetween, wherein the refractive index of each gap may be varied by applying chosen voltages to adjacent pixel electrodes, disposed at the approximate location of the Fourier plane and adapted for receiving the focused, dispersed light, the focused light intercepting a large number of pixel electrodes in the array of pixel electrodes; and
   means for generating chosen voltages on the pixel electrodes of said spatial light modulator; whereby a high spatial-frequency periodic phase grating is formed effective for scattering selected components of the dispersed light to higher orders, and for reflecting the zero-order light beam back to said focusing element and onto said dispersive element from which a shaped pulse is reflected, a phase delay being generated on chosen wavelengths by biasing the phase grating with a desired offset phase.

2. The apparatus of claim 1, wherein said dispersive element comprises a diffraction grating.

3. The apparatus of claim 1, wherein said dispersive element comprises a prism.

4. The apparatus of claim 1, further comprising a compressor intercepting the light reflected from said spatial light modulator subsequent to its second reflection from said dispersive element, for compensating for the residual chirp from said pulsed light source.

5. The apparatus of claim 1, wherein the location of said spatial light modulator relative to the back focal plane, and the location of said dispersive element relative to the front focal plane are chosen to minimize initial quadratic spectral phase of the light pulses.

6. A method for phase and amplitude light pulse shaping, comprising the steps of:
   generating pulsed light having a chosen optical bandwidth and center wavelength;
   dispersing the pulsed light into wavelengths within the optical bandwidth using an optical dispersive element;
   generating a high spatial-frequency periodic phase grating effective for scattering selected frequency components to higher orders, and for introducing a chosen phase delay at selected wavelengths, using a reflective spatial light modulator;
   focusing the dispersed light into a spot much larger than the spatial frequency of the phase grating at the Fourier plane of a focusing element, wherein the distance between the focusing element and the dispersive element is approximately equal to the distance between the focusing element and the reflective light modulator; and
   reflecting the zero-order light beam from said reflective light modulator back to the focusing optic and onto the dispersive element; whereby a shaped pulse is reflected from the dispersive element.

7. The method of claim 6, wherein the dispersive element comprises a diffraction grating.

8. The method of claim 6, wherein the dispersive element comprises a prism.

9. The method of claim 6, further comprising the step of intercepting the light reflected from the spatial light modulator subsequent to its being reflected by the dispersive element, for compensating for residual chirp on the pulsed light.

10. The method of claim 6, wherein the distance between the spatial light modulator and the focal element, and the distance between the dispersive element and the focal element are chosen to minimize initial quadratic spectral phase of the light pulses.

11. An apparatus for phase and amplitude light pulse shaping, comprising in combination:
   a pulsed light source for generating light having a chosen optical bandwidth and center wavelength;
   a focusing element having a front focal plane and an equally distant back Fourier plane;
   a dispersive element disposed at the approximate location of the front focal plane of said focusing optic for receiving light from said pulsed light source and for dispersing light within the chosen bandwidth into wavelengths, wherein the dispersed light exiting said dispersive element is focused at the Fourier plane by said focusing element; and
   means, disposed at the approximate location of the Fourier plane, for receiving the focused, dispersed light, for generating a high spatial-frequency periodic phase grating effective for scattering selected components of the dispersed light to higher orders, wherein the focused light intercepts a large number spatial modes of the grating, and for reflecting the zero-order light beam back to said focusing optic and onto said dispersive element from which a shaped pulse is reflected, a phase delay being generated on the chosen wavelengths by biasing the phase grating with a desired offset phase.

12. The apparatus of claim 11, wherein said dispersive element comprises a diffraction grating.

13. The apparatus of claim 1, wherein said dispersive element comprises a prism.

14. The apparatus of claim 11, further comprising a compressor intercepting the light reflected from said means for generating the phase grating subsequent to its second reflection from said dispersive element, for compensating for the residual chirp from said pulsed light source.

15. The apparatus of claim 11, wherein the location of said means for generating the phase grating, the location of said dispersive element, and the location of said focusing element are chosen to minimize initial quadratic spectral phase of the light pulses.

16. An apparatus for phase and amplitude light pulse shaping, comprising in combination:
a pulsed light source for generating light having a chosen optical bandwidth and center wavelength;
a focusing element;
a dispersive element for receiving light from said pulsed light source and for dispersing light within the chosen bandwidth into wavelengths and for directing the dispersed light to said focusing element; and
means, for receiving the focused, dispersed light, for generating a high spatial-frequency periodic phase grating effective for scattering selected components of the dispersed light to higher orders, wherein the focused light intercepts a large number spatial modes of the grating, and for reflecting the zero-order light beam to said focusing element; whereby said focusing element, said dispersive element and said phase grating are disposed in a folded Martinez stretcher configuration, wherein a shaped pulse is reflected from said dispersive element, a phase delay being generated on the chosen wavelengths by biasing the phase grating with a desired offset phase.

17. The apparatus of claim 16, wherein said dispersive element comprises a diffraction grating.

18. The apparatus of claim 16, wherein said dispersive element comprises a prism.

19. The apparatus of claim 16, further comprising a compressor intercepting the light reflected from said means for generating the phase grating subsequent to its second reflection from said dispersive element, for compensating for the residual chirp from said pulsed light source.

20. The apparatus of claim 16, wherein the location of said means for generating the phase grating, that for said dispersive element, and that for said focusing element, in the Martinez configuration, are chosen to minimize initial quadratic spectral phase of the light pulses.

21. An apparatus for phase and amplitude light pulse shaping, comprising in combination:
a pulsed light source for generating light having a chosen optical bandwidth and center wavelength;
a first focusing element having a front focal plane and an equally distant first back Fourier plane;
a first dispersive element disposed at the approximate location of the front focal plane of said focusing optic for receiving light from said pulsed light source and for dispersing light within the chosen bandwidth into wavelengths, wherein the dispersed light exiting said dispersive element is focused at the first Fourier plane by said focusing element;
a second focusing element having a second front focal plane and an equally distant second back Fourier plane;
means, disposed at the approximate location of the first Fourier plane, for receiving the focused, dispersed light, for generating a high spatial-frequency periodic phase grating effective for scattering selected components of the dispersed light to higher orders, wherein the focused light intercepts a large number spatial modes of the grating, and for transmitting the zero-order light beam through the phase grating to said second focusing optic, said phase grating being disposed at the second Fourier plane of said second focusing optic; and
a second dispersive element disposed at the second front focal plane of said second focusing element for receiving the focused light from said second focusing element and from which a shaped pulse is reflected, a phase delay being generated on the chosen wavelengths by producing a desired offset phase on said phase grating.

22. The apparatus of claim 21, wherein said first dispersive element and said second dispersive element comprise diffraction gratings.

23. The apparatus of claim 21, wherein said first dispersive element and said second dispersive element comprise prisms.

24. The apparatus of claim 21, further comprising a compressor intercepting the light transmitted by said means for generating the phase grating subsequent to its reflection from said second dispersive element, for compensating for the residual chirp from said pulsed light source.

25. The apparatus of claim 21, wherein the location of said means for generating the phase grating, the location of said first and said second dispersive elements, and the location of said focusing element are chosen to minimize initial quadratic spectral phase of the light pulses.

26. An apparatus for phase and amplitude light pulse shaping, comprising in combination:
a pulsed light source for generating light having a chosen optical bandwidth and center wavelength;
a first focusing element;
a second focusing element;
a first dispersive element for receiving light from said pulsed light source and for dispersing light within the chosen bandwidth into wavelengths and for directing the dispersed light to said first focusing element;
means, for receiving the focused, dispersed light, for generating a high spatial-frequency periodic phase grating effective for scattering selected components of the dispersed light to higher orders, wherein the focused light intercepts a large number spatial modes of the grating, and for transmitting the zero-order light beam to said second focusing element;
a second dispersive element for receiving light from said second focusing element pulsed light source, whereby said first focusing element, said second focusing element, said first dispersive element, said second dispersive element, and said phase grating are disposed in an unfolded Martinez stretcher configuration, wherein a shaped pulse is reflected from said second dispersive element, a phase delay being generated on the chosen wavelengths by producing a desired offset phase on said phase grating.

27. The apparatus of claim 26, wherein said first dispersive element and said second dispersive element comprise diffraction gratings.

28. The apparatus of claim 26, wherein said dispersive element comprises a prism.

29. The apparatus of claim 26, further comprising a compressor intercepting the light reflected from said means for generating the phase grating subsequent to its second reflection from said dispersive element, for compensating for the residual chirp from said pulsed light source.

30. The apparatus of claim 26, wherein the location of said means for generating the phase grating, that for said dispersive element, and that for said focusing element, in the Martinez configuration, are chosen to minimize initial quadratic spectral phase of the light pulses.

* * * * *